(12) United States Patent
Haratyk

(10) Patent No.: US 9,390,819 B2
(45) Date of Patent: Jul. 12, 2016

(54) SUBMERGED ENERGY PRODUCTION MODULE

(71) Applicant: DCNS, Paris (FR)

(72) Inventor: Geoffrey Haratyk, Paris (FR)

(73) Assignee: DCNS, Paris (FR)

( * ) Notice: Subject to any disclaimer, the term of this patent is extended or adjusted under 35 U.S.C. 154(b) by 0 days.

(21) Appl. No.: 13/824,757

(22) PCT Filed: Jan. 18, 2013

(86) PCT No.: PCT/EP2013/050946
§ 371 (c)(1),
(2) Date: Mar. 18, 2013

(87) PCT Pub. No.: WO2013/107863
PCT Pub. Date: Jul. 25, 2013

(65) Prior Publication Data
US 2014/0321594 A1    Oct. 30, 2014

(30) Foreign Application Priority Data
Jan. 18, 2012    (FR) ...................... 12 50493

(51) Int. Cl.
*G21C 15/18*    (2006.01)
*G21C 9/00*    (2006.01)
*G21C 11/04*    (2006.01)
G21C 13/00    (2006.01)
G21D 1/00    (2006.01)

(52) U.S. Cl.
CPC    *G21C 15/18* (2013.01); *G21C 9/00* (2013.01);
*G21C 11/04* (2013.01); G21C 13/00 (2013.01);
G21D 1/00 (2013.01); Y02E 30/40 (2013.01)

(58) Field of Classification Search
CPC ........................................................ G21C 15/18
USPC ..................... 376/282, 273, 283, 317, 912
See application file for complete search history.

(56) References Cited

U.S. PATENT DOCUMENTS

| 3,118,818 | A | * | 1/1964 | Bray ............................ 376/912 |
| 3,837,308 | A | * | 9/1974 | Harvey et al. ................. 376/282 |
| 3,840,431 | A | * | 10/1974 | Devin et al. ................... 376/406 |
| 4,213,824 | A | * | 7/1980 | Jabsen .......................... 376/283 |
| 4,302,291 | A | * | 11/1981 | Severs et al. .................. 376/912 |
| 5,247,553 | A | * | 9/1993 | Herring ........................ 376/284 |

(Continued)

FOREIGN PATENT DOCUMENTS

FR    2958783 A1 * 10/2011

*Primary Examiner* — Jack W Keith
*Assistant Examiner* — Daniel Wasil
(74) *Attorney, Agent, or Firm* — Knobbe Martens Olson & Bear LLP

(57)    ABSTRACT

An underwater electricity production module includes an elongated cylindrical box, which includes a reactor compartment and an electricity generator compartment. The reactor compartment includes a reservoir chamber and a dry chamber. A nuclear reactor is located in the dry chamber. The reservoir chamber forms a safety water storage reservoir. At least a radial wall of the reservoir chamber is in a direct heat exchange relationship with a marine environment that surrounds the cylindrical box. The reservoir chamber and the dry chamber can be placed in fluid connection. A seawater inlet is formed in a radial wall of the receiving compartment. A duct connects the seawater inlet to the dry chamber. A quenching valve is in the duct. Opening of the quenching valve allows the dry chamber, and thus the nuclear reactor, to be quenched with seawater.

19 Claims, 5 Drawing Sheets

(56) References Cited

U.S. PATENT DOCUMENTS

| | | | |
|---|---|---|---|
| 5,761,262 A * | 6/1998 | No | 376/283 |
| 7,978,806 B1 * | 7/2011 | Hayman | 376/912 |
| 2012/0328069 A1 * | 12/2012 | Kolmayer et al. | 376/320 |

\* cited by examiner

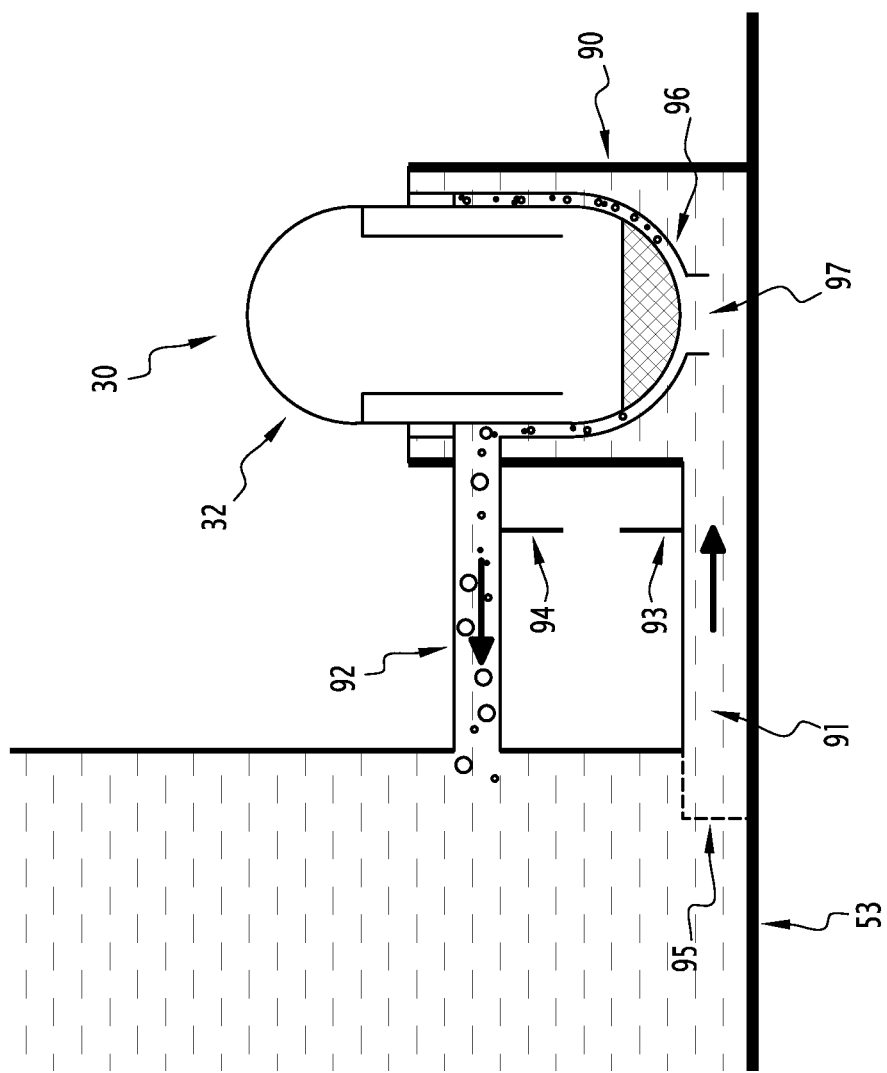

SUBMERGED ENERGY PRODUCTION MODULE

FIELD OF THE INVENTION

The present invention relates to a submerged or underwater electricity production module.

BACKGROUND OF THE INVENTION

More particularly, the invention relates to an underwater electricity production module, which includes means in the form of an elongated cylindrical box in which means are integrated forming an electricity production unit including means forming a nuclear boiler, associated with electricity production means connected to an external electricity distribution station by electrical cables.

Such modules are known in the state of the art.

Reference may for example be made to documents U.S. Pat. No. 5,247,553, JP 50 018 891 and U.S. Pat. No. 4,302,291.

These various documents describe underwater or submerged electricity production units in which electricity production means can be integrated associated with means forming a nuclear boiler, for example.

It is known that such structures have a certain number of advantages, since nuclear-based energy is an effective and profitable answer to energy and ecological problems.

Such structures also make it possible to resolve a certain number of problems, in particular related to safety and accounting for risks, whether natural, such as tsunamis, hurricanes or others, or human, for example such as plane crashes or malicious acts.

It is also known that these various projects have not resulted in industrial exploitations for the moment, due to the fact that their technical feasibility and economic relevance have not been demonstrated.

Work to improve this type of structure has been conducted by the Applicant for a number of years.

This work has already resulted, for example, in the filing of a number of patent applications to which reference can be made, and in particular documents FR 2951008, FR 2951009, FR 2951010, FR 2951011, FR 2951012, FR 2958782, FR 2958783 and FR 2958784.

Several of these documents in particular deal with the operating safety of these types of modules, and in particular their safety in case of major incident, as has recently occurred for land-based power plants.

SUMMARY OF THE INVENTION

The aim of the invention is to propose still other improvements to this type of submerged module to further improve the operating safety thereof.

To that end, the invention relates to an underwater electricity production module of the type including means in the form of an elongated cylindrical box in which means are integrated forming an electricity production unit including means forming a nuclear boiler, associated with electricity production means connected to an external electricity distribution station by electrical cables, characterized in that the nuclear boiler-forming means are placed in a dry chamber of the reactor compartment associated with the chamber forming a safety water storage reservoir of the reactor whereof at least the radial wall is in a heat exchange relationship with the marine environment, in that the dry chamber of the reactor compartment is associated with a compartment receiving electricity production means, and in that the latter includes means for introducing quenching water of the dry chamber receiving the reactor, placed in its lower portion and including a seawater inlet formed in the radial wall of the module at that compartment receiving the electricity production means, a conduit between that seawater inlet and the dry chamber of the reactor compartment, and means forming a quenching valve for that chamber.

According to other aspects of the invention, the underwater module comprises one or more of the following features:
- the nuclear boiler means include a primary circuit comprising at least one reactor container, a pressurizer, a steam generator and a primary pump and a primary backup circuit in parallel on that primary circuit and including at least one primary passive heat exchanger placed in the safety water storage reservoir chamber of the reactor;
- the primary passive heat exchanger placed in the safety water storage reservoir chamber of the reactor is placed at a higher level than that of the reactor container;
- each branch of the primary backup circuit includes valve-forming means;
- the primary backup circuit is connected to the primary circuit upstream or downstream from the primary pump;
- the primary backup circuit is connected to the primary circuit upstream from the primary pump and in that it includes means for short-circuiting that primary pump;
- the nuclear boiler means include a secondary circuit associated with the electricity production means and a secondary backup circuit in parallel on that secondary circuit and including at least one secondary passive heat exchanger placed outside the underwater module in the marine environment;
- the secondary passive heat exchanger placed outside the underwater module in the marine environment is placed at a higher level than that of the steam generator;
- each branch of the secondary backup circuit includes valve-forming means;
- the secondary circuit includes isolating valve-forming means and in that the secondary backup circuit is connected between said isolating valve means;
- the secondary circuit extends partially in a compartment receiving the electricity production means and in that the secondary backup circuit passes through the radial wall of the compartment and is connected to the secondary passive heat exchanger placed outside said compartment;
- the dry chamber of the reactor compartment is connected to the safety water storage reservoir chamber of the reactor by depressurizing means including means forming a depressurizing valve placed in the upper portion of the dry chamber and connected to means forming a bubbler placed in the lower portion of the reservoir-forming chamber and in that excess flow check means are provided between the upper portion of said reservoir-forming chamber and the dry chamber;
- the nuclear boiler means include a reactor container, placed in a reactor pit whereof the lower portion is connected to the lower portion of the safety water storage reservoir chamber of the reactor through means forming a water intake conduit placed along the radial wall of the module and whereof the upper portion is connected to a corresponding portion of the storage reservoir chamber through means forming a water return conduit;
- valve means are placed in the means forming intake and return ducts;
- an enclosure made from a thermally insulating material is placed around the portion of the reactor container housed in the reactor pit, at a distance from the wall of that container, so as to define an interstice forming a thermal barrier between said enclosure and said container;

during normal operation, the interstice between the enclosure and the container is filled with a gaseous material and in that the enclosure includes, in the lower portion thereof, at least one water inlet opening;

during normal operation, the water placed in the reactor pit is borated water;

the end of the water inlet duct connected to the water storage reservoir chamber is associated with a filtering screen;

the nuclear boiler means include a pressurizer connected by the depressurizing means to the safety water storage reservoir chamber of the reactor;

the depressurizing means include a depressurizing circuit provided with a depressurizing valve connected to means forming a bubbler placed in the lower portion of the safety water storage reservoir chamber of the reactor;

means for deviating the jet of water are placed across from the means for introducing seawater into the dry chamber of the reactor compartment;

vent-forming means are placed in the upper portion of the dry chamber of the reactor compartment between the latter and the compartment receiving the electricity production means;

the inlet of the vent means is associated with filtering means; and it includes valve means for connecting the safety water storage reservoir chamber of the reactor to the reactor container.

BRIEF DESCRIPTION OF THE DRAWINGS

The invention will be better understood using the following description, provided solely as an example and done in reference to the appended drawings, in which:

FIGS. 4 and 5 illustrate a safety operating mode of a module according to the invention.

DETAILED DESCRIPTION OF THE PREFERRED EMBODIMENTS

As previously indicated, the invention relates to a submerged or underwater electricity production module.

Figure 1:
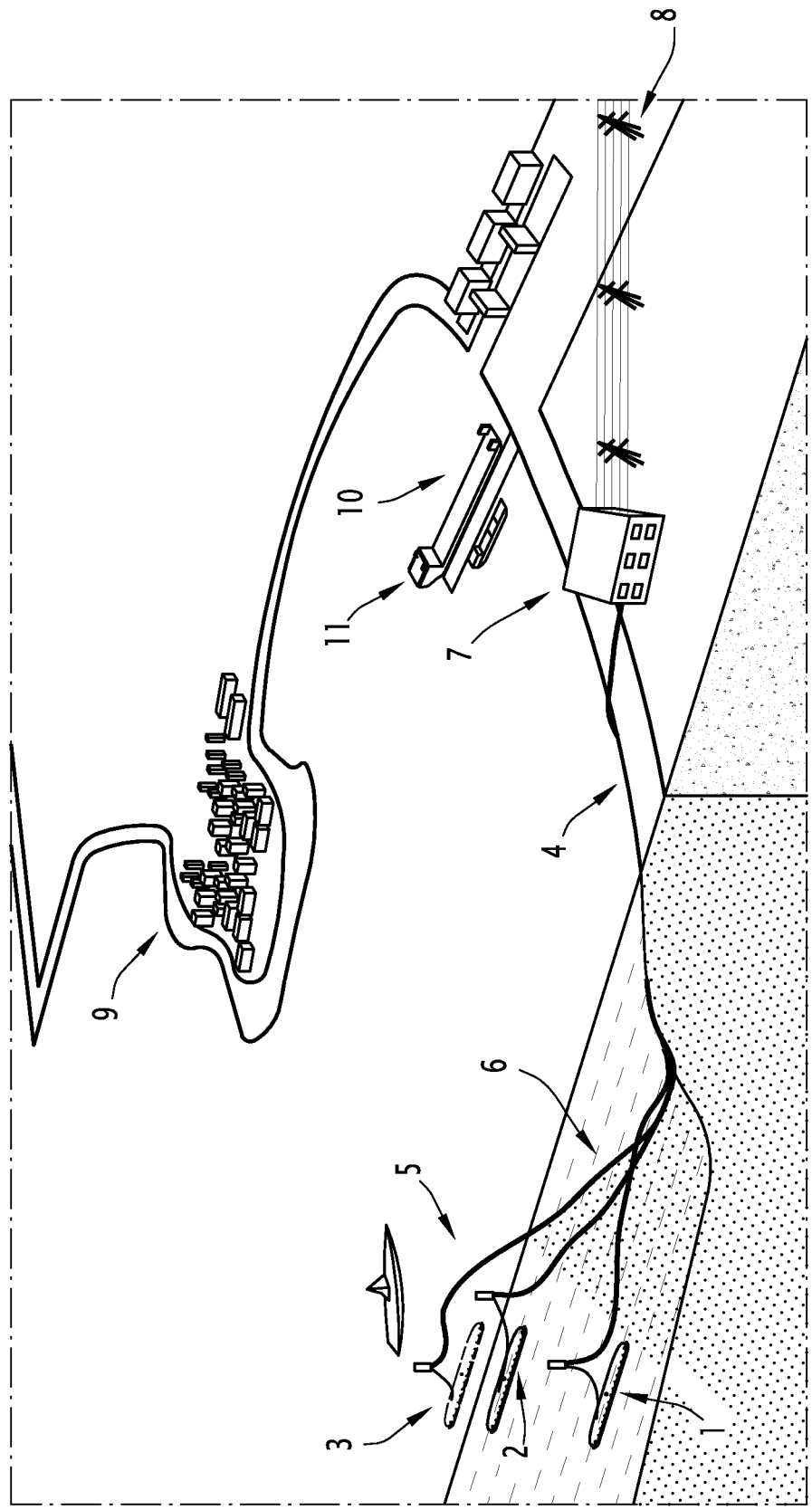
FIG. 1 shows a general view of one example of an electricity production site including underwater electricity production modules according to the invention.

Such modules are for example illustrated in said FIG. 1 and are for example designated by general references 1, 2 and 3 in that figure.

These modules are for example associated and submerged off a coast designated by general reference 4, and they are for example placed on the bottom or kept at some distance from the bottom of the sea, on an electricity production site designated by general reference 5.

These different modules are connected by electrical cables, designated by general reference 6, to an external electricity distribution station, also for example serving as a remote control/command center for the modules, that center for example being land-based and designated by general reference 7 in FIG. 1.

This external electricity distribution station is then traditionally connected using electricity distribution lines designated by general reference 8, for example to an electricity distribution grid for example powering a town located nearby and designated by general reference 9 or any other electricity consumer in general.

It will also be noted that land-based infrastructures, for example such a support designated by general reference 10, can be considered to house support means, for example such as support vessels, one of which is designated by general reference 11 in that figure, making it possible to intervene on the production site.

The support means for example make it possible to place the modules, ensure that they are kept in operational condition, or recover them for major operations to be performed on land, such as replacing the nuclear fuel.

Figure 2:
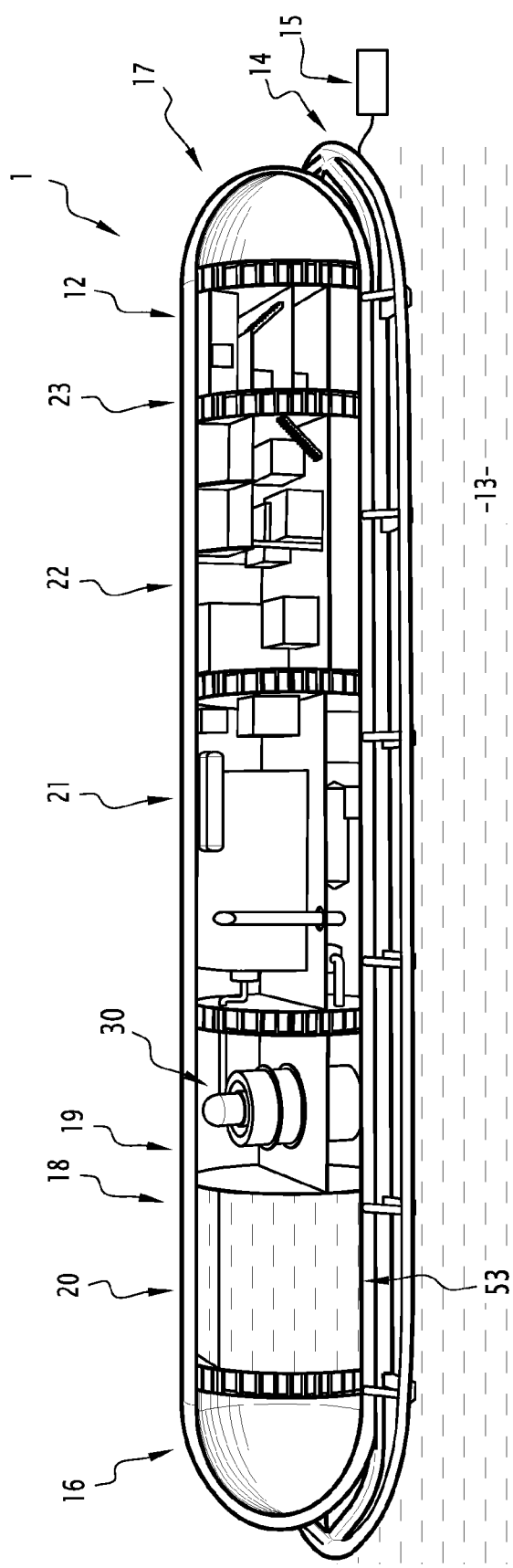
FIG. 2 shows a general cross-sectional side view of one example embodiment of an electricity production module according to the invention.

In fact, and as illustrated in FIG. 2, each underwater electricity production module designated by general reference 1 in this FIG. 2 includes means in the form of an elongated cylindrical box, the ends of which are for example rounded.

These means are designated by general reference 12 in this figure, and are placed on the bottom or kept at some distance from the bottom, for example 13, of the sea and to that end include leg assemblies designated by general reference 14 and anchor means designated by general reference 15, making it possible to position, place, and maintain that module on the bottom.

Different embodiments of the leg assemblies and anchor means can be considered.

FIG. 2 also describes one possible embodiment of the inside of such a module, which in fact includes a certain number of compartments placed next to each other, and separated by partitions.

Thus, for example, such a module 12 may include, at each end thereof, means in the form of a ballast designated by general references 16 and 17, for example making it possible to control the submersion of the module.

Furthermore and going from left to right in FIG. 2, this module may include a reactor compartment designated by general reference 18 in that figure, the reactor compartment in turn being divided into two associated chambers, i.e., a dry reactor compartment chamber strictly speaking, designated by general reference 19 and in which means forming a nuclear boiler are housed, and the chamber forming a safety water storage reservoir of that reactor, designated by general reference 20.

These chambers of the reactor compartment 18 are for example placed next to each other and are separated by a so-called tight partition.

Next to this reactor compartment, a compartment is provided for receiving electricity production means, that compartment being designated by general reference 21 and for example comprising a turbo-alternator group or assembly or other auxiliary systems, as will be described in more detail hereafter.

After this compartment 21 for receiving electricity production means, the module 12 may include a compartment forming an electrical plant designated by general reference 22 for example for voltage conversion, etc., traditionally, and a compartment 23 including a control station for all of the elements of the module, for example.

Of course, other embodiments of the inside of the module and other configurations and arrangements of the elements thereof may be considered.

Thus, for example, a living compartment intended to house a crew member, for example for exploitation or intervention purposes, may also be considered.

Figure 3:
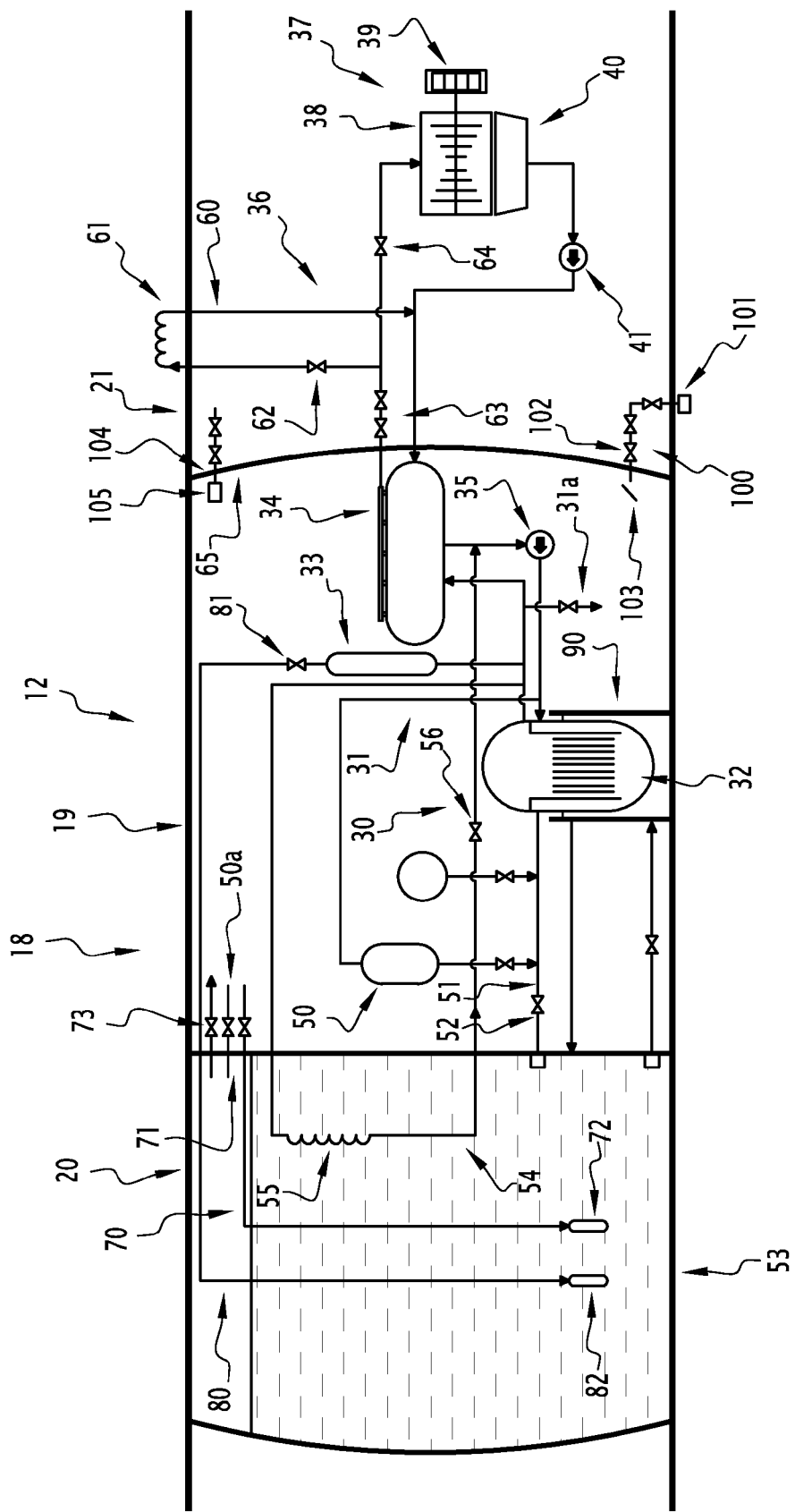
FIG. 3 shows a partial view of an electricity production module according to the invention.

FIG. 3 shows, in more detail, the part of the module 12 where the reactor compartment 18 and the compartment 21 intended to receive the electricity production means are provided.

As also previously indicated, the reactor compartment 18 is therefore intended to receive means forming a nuclear boiler and includes two chambers, i.e., the dry chamber for receiving the reactor strictly speaking, designated by general reference 19, and the safety water storage reservoir chamber thereof, designated by general reference 20.

In fact, and traditionally, the nuclear boiler means, which are designated by general reference 30 in this FIG. 3, then include a primary circuit designated by general reference 31 comprising at least one reactor container 32, a pressurizer 33, a steam generator 34 and a primary pump 35.

These nuclear boiler means 30, and more particularly the steam generator 34 thereof, also include the secondary circuit, which passes through the separating partition of the reactor and electricity production means receiving compartments 18 and 21, and associated with said electricity production means.

The secondary circuit is designated by general reference 36 in this FIG. 3 and the electricity production means are designated by general reference 37 and are therefore positioned in the compartment 21.

In fact, these electricity production means 37 for example include a turbine designated by general reference 38 in this figure, associated with an alternator designated by general reference 39, a condenser designated by general reference 40 and a secondary pump designated by general reference 41 in FIG. 3.

This architecture of the electricity production means is simplified here for comprehension purposes. As everyone knows, it is in reality more complex to increase the output of the thermodynamic cycle.

Also traditionally, the boiler means 30 are connected to different means making it possible to inject water therein at different pressures, for example in the case of a primary water loss accident.

These means are for example designated by general reference 50 in FIG. 3 and comprises injection means, for example high-, medium- or low-pressure, for injecting water into the reactor depending on the nature of the accident and the selected backup strategy.

Thus for example, the safety water storage reservoir chamber 20 can be connected to the reactor container 32 by means of a conduit designated by general reference 51 in this figure, associated with the valve means designated by general reference 52.

Other traditional injection systems for injecting water into the reactor are also provided.

Vent means 50a are then provided between the dry chamber 19 and the safety reservoir chamber 20.

If needed, these vent means, which are normally closed, open to allow air to enter the reservoir chamber and therefore to allow the low-pressure injection of water from the reservoir into the container 32 by means of the direct injection line 51.

If the pressure is too great in the primary circuit to perform this injection, the primary circuit can be depressurized rapidly using depressurizing valve means designated by general reference 31a, in addition to other depressurizing means that will be described in more detail hereafter.

These valve and vent means are then controlled and commanded by control-command members, which can be automated or driven by human operators.

In the underwater module according to the invention, the safety water storage reservoir 20 of the reactor is used for other safety functions thereof and at least its radial wall designated by general reference 53 is in a heat exchange relationship with the marine environment in which that module is submerged.

This makes it possible to form a quasi-unlimited cold source that is naturally continuously available, independently of the circumstances and operating problems that may arise, to cool the module and in particular the nuclear boiler means.

The problems having recently arisen in nuclear power plants have in fact become serious following the loss of this cold source.

It is in fact known that one of the major problems related to the operation of nuclear reactors relates to the fact that such a reactor continues to generate extremely significant quantities of heat, even after the chain reaction is stopped and for a relatively long period of time.

As an example, a small reactor of 160 electric MW (500 thermal MW) still creates a power of 3 thermal MW three days after it is stopped.

This characteristic requires that these reactors be associated with specific cooling systems to discharge that residual power and that the continuous availability thereof be ensured.

Without such a system, the core of the reactor has a very high likelihood of melting and causing radioactive materials to be dispersed into the environment.

Recent events have shown the potential consequences of the simultaneous loss of a cold source, for example such as seawater intakes, and electricity making it possible to provide energy to those cooling systems.

In fact, the great majority, if not all currently known nuclear reactors use backup systems using pumps to discharge the residual power from the core toward a cold source, for example through exchangers.

These systems are of course made redundant, diversified, and are subject to careful inspection and maintenance to maximally reliabilize the cooling function of the core in case of stop or accident.

In the same spirit, land-based nuclear power plants have various redundant electricity sources to power those backup systems, for example such as power supply means using redundant electric grids, generator groups, or backup batteries, etc.

However, experience has shown that all of these systems may fail at one time or another, which ultimately amounts to the loss of the cold source and therefore a cooling failure of the reactor, with the consequences that have been seen on several reactors.

This is not the case and cannot occur in the energy production module according to the invention.

In fact, that module may include various so-called "passive" safety systems, i.e., not requiring electricity to operate, except, depending on the selected embodiment, for example for the power required for their control-command.

The reactor may first include a primary passive cooling circuit in parallel on the primary circuit of the reactor.

This primary passive backup circuit is designated by general reference 54 in FIG. 3 and includes at least one primary passive heat exchanger designated by general reference 55, placed in the safety water storage reservoir chamber of the reactor, that chamber being designated by general reference 20 in FIG. 3.

In fact, this heat exchanger 55 may for example be placed in the safety water storage reservoir chamber 20 of the reactor, at a higher level than that of the container 32 of the reactor, and one or each branch of that primary backup circuit 54 may include valve means.

Such valve means are for example designated by general reference 56 in FIG. 3 and the primary passive backup circuit 54 may be connected to the primary circuit upstream or downstream of the primary pump previously described and designated by general reference 35.

In the case where the primary passive backup circuit is connected to the primary circuit upstream from the primary pump 35, it also that includes means for short-circuiting the primary pump.

On the other side, the backup circuit is connected between the container and the steam generator.

One can then see that this primary passive backup circuit makes it possible to discharge the residual power of a submerged nuclear reactor for a very long period of time by using a natural cooling loop.

In fact, opening this primary passive backup circuit makes it possible to form a bypass loop of the primary circuit, so as to discharge the heat produced in the core of the reactor toward the cold water reserve through an exchanger, that cold water reserve being formed by the safety water storage reservoir 20 of the reactor.

Furthermore, the radial wall 53 of that chamber forming a water reservoir 20 is, as previously indicated, in a heat exchange relationship with the marine environment, and therefore makes it possible to form a long-term, or even quasi-unlimited cold source, by heat dissipation in the marine environment.

Thus, the discharge of the residual power from the reactor is done through the bypass loop of the primary circuit of the reactor, that loop comprising:
- a cold water reservoir situated in the dedicated chamber 20 of the reactor compartment, formed by the safety water storage reservoir of the reactor,
- two pipe elements tapped at the outlet of the container of the reactor and the inlet of the primary pump, for example,
- a heat exchanger 55 submerged in the safety water storage reservoir constituting a primary passive exchanger,
- the shell 53 of the compartment ensuring the heat exchanges between the safety water storage reservoir and the sea, and
- associated control/command valves.

During normal operation of the module, a valve can then close that passive cooling loop and no fluid circulates therein.

The water reserve in the reservoir-forming chamber 20 is at a low temperature, i.e., for example at the temperature of the seawater, and at a low pressure, while the primary fluid, i.e., that circulating in the primary circuit of the reactor, is at a high pressure and high temperature.

The thermal power of the reactor is discharged toward the steam generator(s) of the primary circuit using the primary pump(s).

When the reactor is stopped in a normal or accidental situation, the reactor is halted and the passive backup cooling thereof is implemented.

The valve(s) of the passive cooling loop for example open automatically or on command, and, for example, the inertia of the primary pump starts a fluid movement in that loop, i.e., in the primary passive backup circuit.

The hot water leaving the core of the reactor then rises in the cooling loop up to the exchanger 55, where it transmits its heat to the cold water reserve contained in the chamber 20 in a heat exchange relationship with the sea.

The water, becoming heavier, then re-descends in the loop to rejoin the cold branch of the circuit and the core of the reactor, where it is heated again.

The water in that backup circuit is liquid throughout the entire cycle. The cycle maintains itself indefinitely as long as the temperature difference between the core and the safety water storage reserve is large, i.e., for several days, or even several weeks.

In fact, the submersion of the module, and in particular of the reactor compartment thereof, in the sea gives the safety water storage reservoir a significant cooling capacity through the shell in a heat exchange relationship with the marine environment, to dissipate the power transmitted by the passive exchanger.

It is thus possible to see that such a safety system, applicable to a submerged reactor, has a major asset relative to land-based reactor systems, in particular in terms of passive safety operation, inasmuch as the primary passive backup circuit operates based on a natural circulation between the hot source (the container of the reactor) and the quasi-unlimited cold source (the primary passive exchanger placed in the safety water storage reservoir of the reactor, in a heat exchange relationship with the sea).

Such a backup system is then not dependent on any power supply for a pump, the availability of water intake, for example seawater, etc., to ensure cooling of the reactor.

Likewise, a secondary passive cooling circuit can also be provided in parallel on the secondary circuit of the reactor.

This secondary passive backup circuit is for example designated by general reference 60 in FIG. 3.

The latter is then connected in parallel on the secondary circuit 36 of the reactor, for example in the compartment 21 designed to receive the turbo-alternator group 37, and then also includes at least one secondary passive heat exchanger designated by general reference 61, placed outside the underwater module in the marine environment and connected to the rest thereof by pipe elements passing through the radial wall of the compartment 21.

This secondary passive heat exchanger 61 is then also placed a higher level than that of the steam generator 34 so as to form a backup cooling circuit with natural circulation.

This also makes it possible to discharge heat from the secondary circuit of the reactor, using a quasi-inexhaustible cold source, i.e., also the marine environment.

In a module as considered, the heat generated by the nuclear reaction in the core of that reactor is, in a normal exploitation situation, transmitted to a coolant of a primary circuit and discharged in primary heat exchangers, generally called steam generators, like that designated by general reference 34 in FIG. 3.

In these exchangers, a second fluid circulates and begins to boil. The steam thus produced supplies a turbine driving an alternator to generate electricity.

This is called the secondary circuit, like that designated by general reference 36 in FIG. 3, associated with the electricity generating means designated by reference 37.

These steam generators therefore act as a cold source for the primary circuit of the reactor and the heat extraction is driven by secondary pumps of that circuit.

In an accident situation, for example for a traditional land-based reactor, nuclear fission stops, but the core continues to generate significant heat due to the radioactivity.

The heat generators can still perform their role as cold source and discharge power from the core on the condition that the secondary pumps, and in general the secondary circuit, continue to function correctly.

That is why it is crucial that in that type of reactor, the secondary circuit continues to receive electricity, and in particular the secondary pumps, such as the pump designated by reference 41 in FIG. 3.

However, and as previously indicated, the loss of electricity is an eventuality that cannot be completely ruled out. The pumps may then not operate and the cooling of the reactor is then no longer performed. The pumps may also break down.

Here again, in the module according to the invention, the marine environment can be used to form a cold source and resolve these problems.

Thus, in the module according to the invention, the secondary passive heat exchanger 61 is used and placed outside the module to form, with the marine environment, a quasi-inexhaustible natural cold source for the secondary circuit.

Also in this case, the secondary passive heat exchanger 61 is placed outside the underwater module 12 in the marine environment at a higher level than that of the steam generator 34 with which it is associated, so as to allow natural circulation between those elements.

One or each branch of the secondary passive backup circuit designated by general reference 60 in FIG. 3 may also include valve means designated by general reference 62 in that figure.

In fact, the secondary circuit 36 strictly speaking includes isolating valves such as the valves designated by general references 63 and 64 in FIG. 3, the secondary passive backup circuit then being connected to the secondary circuit between those isolating valves.

As also shown in FIG. 3, the secondary circuit in fact passes through the transverse wall 65 separating the reactor compartment 18, and in particular its dry chamber 19, from the compartment 21 receiving the turbo-alternator assembly.

In that case, the secondary passive backup circuit includes pipe elements passing through the radial wall of the module at that compartment receiving the turbo-alternator assembly 21, to connect the secondary passive heat exchanger 61, which makes it possible to avoid any crossing of the shell at the reactor compartment.

One can see that in the module according to the invention, the secondary circuit is also equipped with a passive backup cooling loop bypassed on said main secondary circuit.

In the event electricity is lost and power is therefore cut to the pumps of the secondaries of the steam generators, the backup system may be used to extract the heat from the primary circuit of those steam generators and therefore the reactor through natural circulation through a diphasic passive secondary heat exchanger toward the sea, which then represents a quasi-inexhaustible cold source.

The passive secondary heat exchanger is then placed outside the shell of the module and at a higher level than that of the steam generator to allow that natural circulation, which makes it possible to avoid using pumps that could fail.

Such a system is in fact also completely passive and does not require any electricity.

Such a system then includes:
- a heat exchanger 61 transmitting the heat from the secondary circuit of the boiler means toward the sea, placed outside the compartment designed to receive the turbo-alternator assembly 21,
- two pipe elements for the bypass of the secondary circuit, and the tapping of which may then be done upstream after the isolating valves 63 of the circuit and downstream after the supply pumps 41 or the steam generator(s),
- a valve 62, which is normally closed, situated upstream from the passive exchanger on the bypass line,
- a valve 64, which is normally open, situated upstream from the turbo-alternator group on the secondary circuit and downstream from the tapping of the bypass line,
- tight shell crossings, and
- a control-command system for those valves.

During normal operation of the reactor, no fluid crosses through the secondary passive backup exchanger.

The turbo-alternator group is supplied with steam by the secondary circuit of the steam generator and generates electricity.

The secondary of the steam generator is supplied with water by the secondary pump 41.

In an accident situation, typically in case of loss of electricity resulting in a failure of the secondary pump(s), the valve 62 that is normally closed opens and the valve 64 that is normally open closes.

This action occurs in several seconds, for example automatically or upon demand by an operator.

The turbo-alternator group 37 is then no longer supplied with steam and electricity production stops.

It is then the passive backup secondary exchanger 61 that is supplied with steam. That steam, for example in contact with the tubes of that exchanger cooled by the cold seawater, condenses, discharging its heat toward the environment.

The liquid water then returns by gravity into the steam generator 34 without requiring a secondary pump.

This water heats in the steam generator and is again vaporized before leaving toward the backup circuit.

The cycle maintains itself naturally until the heat transmitted by the primary circuit is no longer sufficient to create steam in the steam generator, i.e., for example after several days of backup operation as previously described.

As previously indicated, the shell crossing for the secondary passive exchanger is situated at the turbo-alternator compartment 21, so as to reinforce the sealing of a third barrier and the confinement of the radioactive materials in the event the first two barriers, i.e., the sheaths and the primary circuit, are no longer tight.

One can thus see that such a system has many advantages relative to land-based system, since it is simple and very effective.

Other safety means are provided in a submerged module according to the invention.

Thus, for example, one possible scenario of a major accident for a pressurized water nuclear reactor is the rupture of a pipe of the primary circuit in the dry chamber 19 of the reactor compartment 18.

This pipe rupture then releases high-temperature water, which, undergoing an abrupt pressure drop, vaporizes instantly in the dry chamber of the reactor compartment.

The confinement enclosure surrounding the reactor is then quickly invaded by high-temperature steam.

The value of the pressure and temperature peak occurring during this accident dimensions the resistance of the enclosure and the equipment contained therein.

For a land-based reactor, the pressure peak reaches several bars and dimensions the thickness of the concrete and metal enclosure that needs to be provided.

For a submerged reactor like that considered in the module according to the invention, this peak reaches higher values due to the smaller volume of the reactor compartment, i.e., in particular the dry chamber 19, relative to a land-based power plant.

Any pressure reduction system during an accident may be interesting then to limit the impact in terms of the stresses applied and that the equipment installed in that chamber in particular must undergo.

In the module according to the invention, the dry chamber 19 of the reactor compartment 18 is connected to the safety water storage reservoir chamber 20 of the reactor, by depressurizing means designated by general reference 70 in FIG. 3.

In fact, these means include means 71 forming a depressurizing valve placed in the upper portion of the dry chamber 19 and which are connected to means forming a bubbler designated by general reference 72, placed in the lower portion of the reservoir chamber 20.

Excess flow check means designated by general reference 73 are provided between the upper portion of that reservoir chamber 20 and the dry chamber 19.

Thus, in the event of a pipe rupture, for example of the primary circuit, the steam from the dry chamber 19 of the reactor compartment 18 is conducted, by a pipe and valve assembly, toward the safety water reservoir 20, which then serves as an overpressure elimination reservoir, where that steam is injected and condenses in contact with the cold water.

In the case of the accident previously considered, the pressure inside the dry chamber 19 is thus immediately reduced and the danger of a break of that enclosure is eliminated.

In general, the radial wall of the reactor compartment 18 is in a heat exchange relationship and is continuously cooled by the seawater, which makes it possible to ensure a discharge of heat toward the marine environment and therefore to cool the water contained in that chamber 20.

In particular, the contact between the cold marine environment and the radial wall of the dry chamber 19 receiving the reactor also makes it possible to ensure condensation of the steam and generally cooling thereof, for example in case of a break of a primary pipe as previously indicated.

The cooling of the wall of this chamber in fact causes the condensation of at least part of the steam contained in that chamber 19 in such an accident case, and also a natural and prolonged manner.

It is in fact not necessary to project water on the outside of this compartment, as is the case in certain land-based power plants, because the module according to the invention is submerged and the wall of the reactor compartment is therefore continuously in contact with the cold water.

The pressure is therefore reduced over the short term by the depressurizing means designated by general reference 70 and over the long term by the radial wall of the dry chamber 19 receiving the reactor, in a completely passive manner.

Furthermore, the pressurizer designated by general reference 33 in FIG. 3 may also be equipped with depressurizing means connected to the reservoir chamber 20.

Thus for example, in FIG. 3, the pressurizer 33 is connected by depressurizing means designated by general reference 80 to the reservoir chamber 20.

In fact, these depressurizing means include a depressurizing circuit provided with a depressurizing valve designated by general reference 81 for example, and connected to means forming a bubbler designated by general reference 82 and also placed in the lower portion of the safety water reservoir chamber 20 of the reactor.

This also makes it possible to discharge, in that reservoir chamber 20, any overpressure of the pressurizer and the primary circuit in general.

Figure 4:
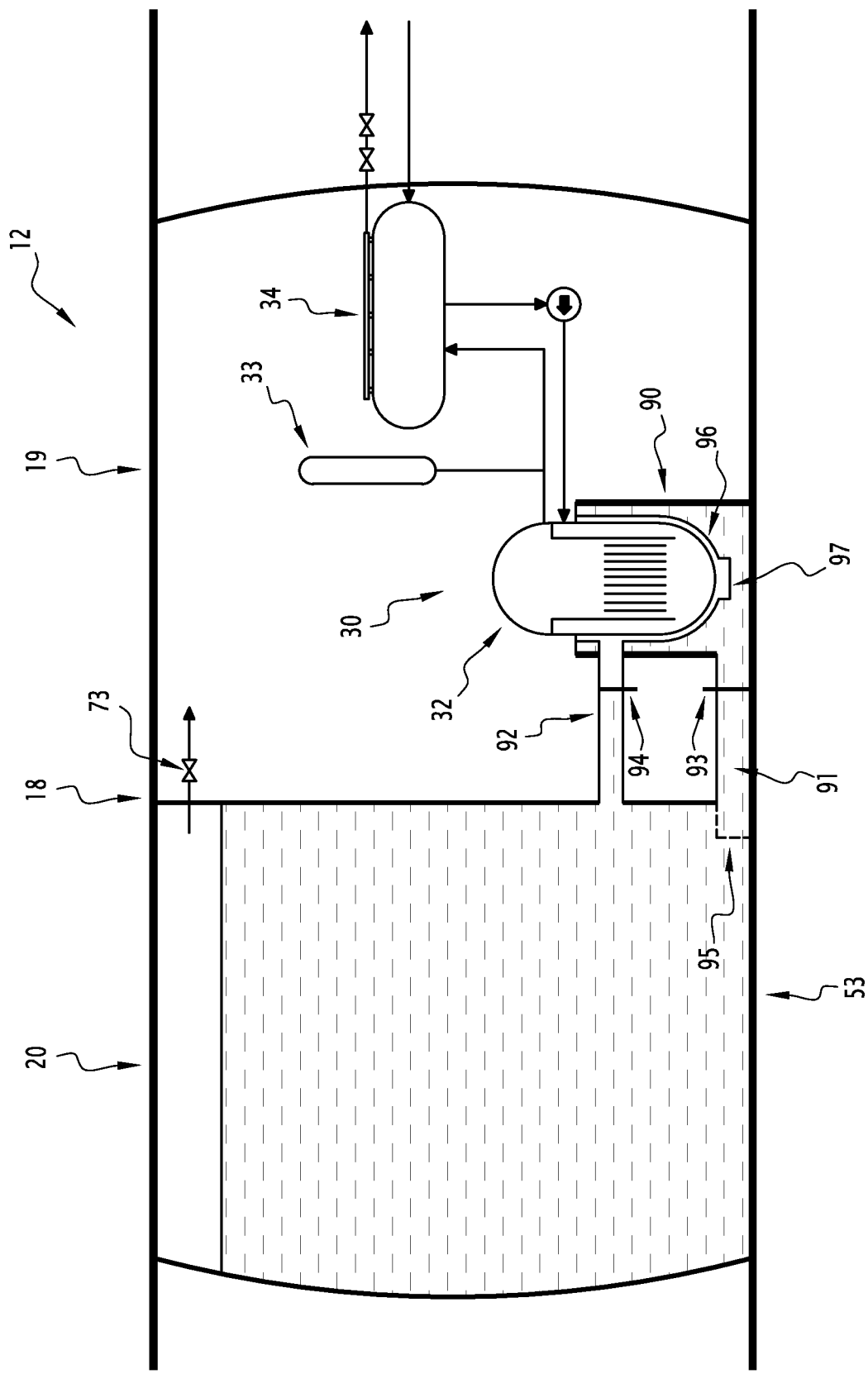

Other safety systems may also be considered, like those illustrated in FIG. 3, and the operation of which is more clearly shown in FIGS. 4 and 5.

FIGS. 4 and 5 in fact show partial views of a module according to the invention.

This module still includes the means in the form of an elongated cylindrical box 12, the reactor compartment 18 with the dry chamber 19, and the safety water storage reservoir chamber 20 of the reactor.

The nuclear boiler means 30 with the reactor container 32 are also shown.

In fact, and as more clearly illustrated in these FIGS. 4 and 5, this reactor container 32 is placed in a reactor pit designated by general reference 90, for example placed at the bottom of the dry chamber 19.

The lower portion of this reactor pit 90 is connected to the lower portion of the safety water storage reservoir chamber 20 of the reactor, through means forming a water intake conduit designated by general reference 91, placed along the radial wall of the module, that wall still being designated by general reference 53.

The upper portion of the reactor pit 90 is connected by means of a water return conduit, designated by general reference 92, to the corresponding portion of the storage reservoir chamber 20.

As illustrated, valve means are for example placed in these means forming a water intake and return of said reactor pit 90 to the reservoir chamber 20.

These valve means are respectively designated by references 93 and 94 for the water intake and return conduits.

Of course, other embodiments can be considered.

It will also be noted, as illustrated, that the end of the water intake conduit 91, connected to the storage water reservoir chamber 20, is associated with a filtering screen, which is designated by general reference 95.

As also illustrated in FIGS. 4 and 5, that enclosure made from a thermally insulating material can be traditionally placed around the reactor container portion 32 housed in that reactor pit 90.

Thus, for example, in FIGS. 4 and 5, this enclosure is designated by general reference 96 and for example assumes the form of a bowl or cup, and is placed away from the wall of the container, so as to define an interstice forming a thermal barrier between said enclosure 96 and said reactor container 32.

In fact, during normal operation, this interstice between the insulating material enclosure 96 and the reactor container 32 can be filled with a gaseous material, for example such as air or another material, as illustrated in FIG. 4, so as to form an additional thermal barrier making it possible to insulate the container so as to avoid heat losses.

The enclosure 96 also includes, in the lower portion thereof, at least one water inlet opening designated by general reference 97 connected with the water intake conduit 91 and then allowing the water to penetrate the interstice around the reactor container.

It will also be noted that during normal operation, the water placed in the reactor pit 90 around the bottom thereof may be borated water.

The water contained in the reservoir chamber 20 may also for example be borated water.

One can see that in case of a serious accident and, for example, melting of the core of the reactor, the corium formed is deposited at the bottom of the container, as illustrated in FIG. 5.

This fusion wash is then capable of piercing the shell if the latter is not cooled. It should be noted that receiving ash from the corium may be provided under the container if that were to occur.

To avoid this phenomenon, in the system according to the invention, the valves 93 and 94 are opened to cause the natural circulation of water in the reactor pit 90 around said reactor container 32, between the container and the reservoir chamber 20.

In fact, when the valves 93 and 94 are opened, the interstice between the container 32 and the insulating material enclosure 96, which is normally filled with air, is then invaded by cold water coming from the reservoir chamber 20.

In contact with the container 32 at a high temperature and in particular the bottom thereof, because this container is heated by the melted corium, the water around the container is brought to boiling and rises in the interstitial space between the insulating material enclosure 96 and the container.

This space being connected to the water reservoir chamber 20, the steam and the hot water rise and escape from the reactor pit as illustrated in FIG. 5, to penetrate the rest of the reservoir chamber 20 where the steam condenses and the water cools.

At the same time, the cold water, which is more dense, from the bottom of the reservoir chamber 20 rushes from the lower portion of that reservoir chamber 20 into the reactor pit 90 through the water intake conduit 91, which extends along the radial wall 53 of the module so as to be in heat exchange contact with the marine environment and thus slightly more cooled.

There is thus a permanent natural water circulation regime established between the reservoir chamber and the reactor pit so as to cool it and for example prevent the corium that is formed from piercing that container.

The water that circulates in that circuit is therefore doubly cooled on the one hand during its passage in the reservoir chamber 20, since the radial wall thereof is in a heat exchange relationship with the marine environment, and on the other hand during its passage in the water intake conduit into the reactor pit, since the latter is also formed along that radial wall.

In fact, the radial wall of the reservoir chamber 20 and the dry chamber 19 of the reactor compartment 18 being in heat exchange contact with the marine environment, the cooling water of the reactor container is cooled continuously and naturally by a quasi-inexhaustible source.

This is also an improvement making it possible to control the temperature, in particular of the reactor container and the corium in case of accident to prevent any new deterioration of the situation.

Lastly and as a last resort, it is also possible to provide quenching of the dry chamber 19 receiving the reactor in the module according to the invention, using seawater.

A decision may in fact be made, for one reason or another, to completely quench the dry chamber 19, and therefore the reactor, using seawater, which has particularly interesting properties for this type of situation.

To that end, as illustrated in FIG. 3, it is provided that the compartment receiving the electricity production means, designated by general reference 21, includes means for introducing quenching water into the dry chamber 19 receiving the reactor.

These quenching means are designated by general reference 100 in FIG. 3 and are for example placed in the lower portion of the compartment 21 receiving the electricity production means.

These quenching means then include at least one seawater inlet designated by general reference 101 in FIG. 3, formed in the radial wall of the module for example at the bottom of that compartment 21 receiving the electricity production means, a water conduit between the seawater inlets 101 and the dry chamber 19 of the reactor compartment 18 passing through the partition separating the reactor compartment and the compartment receiving the electricity production means and means forming a quenching valve for that dry chamber 19, designated by general reference 102.

It will also be noted that means for deviating the water jet leaving said quenching means, designated by general reference 103 in FIG. 3, are for example placed across from said means for quenching the dry chamber of the reactor compartment, to deviate the jet for example toward the bottom of that dry chamber and prevent any additional deterioration of the elements contained in that chamber.

Vent means 104 are also provided in the upper portion of the dry chamber 19 of the reactor compartment 18, between the latter and the compartment 21 receiving the electricity production means, the inlet of those vent means 104 being associated with means designated by general reference 105, for example for filtering particles such as radioactive particles.

One can then see that all of these arrangements make it possible to improve the safety and security of the operation of this type of structure.

In particular, the submersion of this module and its proximity to the marine environment make it possible to take advantage of the fact that that environment may constitute a quasi-inexhaustible and continuously available cold source and which may be used to resolve, by natural circulation or pressure difference, a certain number of problems related to any accident.

In addition, being submerged at a depth makes this module in sensitive to surface phenomena such as, for example, tsunamis or hurricanes. It also protects it from malicious acts.

The invention claimed is:

1. An underwater electricity production module comprising:
   an elongated cylindrical box comprising:
      a receiving compartment and
      a reactor compartment,
         wherein the reactor compartment further comprises:
            a reservoir chamber and
            a dry chamber,
   an electricity production unit integrated in the elongated cylindrical box, said electricity production unit comprising
      a nuclear boiler which comprises:
         a reactor container located in the dry chamber and
         an electricity generator located in the receiving compartment,
            wherein the electricity generator is configured to be connected to an external electricity distribution station by electrical cables,
   at least one connecting element adapted to connect the dry chamber to the reservoir chamber, the reservoir chamber forming a safety water storage reservoir, at least a radial wall of which is in a direct heat exchange relationship with a marine environment surrounding the cylindrical box,
   wherein the receiving compartment includes one connecting device adapted to connect the receiving compartment to the dry chamber,
   wherein the connecting device includes a water introducing arrangement adapted to introduce quenching water into the dry chamber,
      wherein the water introducing arrangement is located in a lower portion of the receiving compartment, the water introducing arrangement including
a seawater inlet formed in a radial wall of the receiving compartment,
a duct between the seawater inlet and the dry chamber, and
a quenching valve in the duct.

2. The underwater electricity production module according to claim 1, wherein the nuclear boiler includes a primary circuit comprising at least one reactor container, a pressurizer, a steam generator and a primary pump and a primary backup circuit in parallel on that primary circuit and at least one primary passive heat exchanger located in the reservoir chamber.

3. The underwater electricity production module according to claim 2, wherein each primary passive heat exchanger located in the reservoir chamber is located at a higher level than that of each reactor container.

4. The underwater electricity production module according to claim 2, wherein each branch of the primary backup circuit includes a valve.

5. The underwater electricity production module according to claim 2, wherein the nuclear boiler includes a secondary circuit associated with the electricity generator and a secondary backup circuit in parallel on that secondary circuit and being connected to at least one secondary passive heat exchanger located outside the elongated cylindrical box in the marine environment.

6. The underwater electricity production module according to claim 5, wherein the secondary passive heat exchanger located outside the elongated cylindrical box in the marine environment is located at a higher level than that of the steam generator.

7. The underwater electricity production module according to claim 5, wherein each branch of the secondary backup circuit includes a valve.

8. The underwater electricity production module according to claim 5, wherein the secondary circuit includes at least two isolating valves and wherein the secondary backup circuit is connected between isolating valves.

9. The underwater electricity production module according to claim 5, wherein the secondary circuit extends partially in the receiving compartment and wherein the secondary backup circuit passes through the radial wall of the receiving compartment, each secondary passive heat exchanger is located outside the receiving compartment.

10. The underwater electricity production module according to claim 1, wherein the dry chamber is directly connected to the reservoir chamber of the reactor by first depressurizing means including a first depressurizing valve located in an upper portion of the dry chamber and connected to a bubbler located in a lower portion of the reservoir chamber and wherein excess flow check means are provided between an upper portion of the reservoir chamber and the upper portion of the dry chamber.

11. The underwater electricity production module according to claim 1, wherein the nuclear boiler includes a reactor container, located in a reactor pit whereof a lower portion is connected to a lower portion of the reservoir chamber through a water intake duct located along a radial wall of the elongated cylindrical box and whereof an upper portion is connected to a corresponding portion of the reservoir chamber through a water return duct.

12. The underwater electricity production module according to claim 11, wherein valves are located in the intake and return ducts.

13. The underwater electricity production module according to claim 11, wherein an enclosure made from a thermally insulating material is located around a portion of the reactor container housed in the reactor pit, at a distance from a wall of the reactor container, so as to define an interstice forming a thermal barrier between enclosure and the reactor container.

14. The underwater electricity production module according to claim 11, wherein during normal operation of the underwater electricity production module, when no accident occurs in the reactor container, the reactor pit comprises borated water.

15. The underwater electricity production module according to claim 1, wherein the nuclear boiler includes a pressurizer connected by second depressurizing means to the reservoir chamber.

16. The underwater electricity production module according to claim 15, wherein the second depressurizing means includes a depressurizing circuit provided with a second depressurizing valve connected to a bubbler placed located in a lower portion of the reservoir chamber.

17. The underwater electricity production module according to claim 1, wherein a device for deviating jets of water is located in front of the water introducing arrangement.

18. The underwater electricity production module according to claim 1, wherein vent-forming means are located in an upper portion of the dry chamber between the dry chamber and the receiving compartment.

19. The underwater electricity production module according to claim 1, wherein the module includes a valve for connecting the reservoir chamber to the reactor container.

* * * * *